3,123,462
METHOD OF DEFOLIATING PLANTS
William E. Duggins, Berkeley Heights, and Frederick A. Hessel, Upper Montclair, N.J., and Jesse Werner, Holliswood, N.Y., assignors to General Aniline & Film Corporation, New York, N.Y., a corporation of Delaware
No Drawing. Filed Jan. 27, 1961, Ser. No. 85,221
12 Claims. (Cl. 71—2.5)

The present invention relates to the defoliation of growing plants and relates more particularly to a method of defoliating plants by the use of acetylenic alcohols.

The importance and desirability of defoliating living plants is well known. Of particular widespread economic importance is the defoliation of cotton, especially since the successful development of the mechanical cotton picker. The presence of excessive foliage at the time of harvesting is undesirable if a successful mechanical harvesting operation is to be utilized.

On normal cotton plants which are not treated with defoliating agents, the bolls on the upper branches continue to open slowly over a period of as long as two months from the time when picking the lower bolls is desirable. The majority of the leaves remain attached to the plant and cause green stains on the cotton when mechanical cotton pickers are employed. In addition, the leaves high on the plant shade the lower bolls from sunlight and air resulting in excessive boll rot. At times, 15% of the cotton crop has been lost because of this boll rot. Without the use of defoliating agents, numerous hand pickings are necessary to prevent boll rot and staining.

A substance which can duplicate the effect of a light frost on a plant is commonly called a defoliating agent. The effect of the application of such a material is equivalent to a light frost causing the formation of abscession layers of cells across the petiole bases of the leaves of the plants with the result that a premature leaf drop occurs.

While by far the largest use at the present time for defoliants is in the defoliation of cotton plants, there is also interest in defoliants for such plants as roses, hydrangeas, many types of fruits and shade trees, and for other field grown crops such as soy beans. Because the widest interest is in the use of defoliants for cottons, the present invention will be described in connection with defoliating cotton, although this invention may also be used in defoliating other plants.

It is suggested in United States Patent No. 2,801,160 that acetylenic glycols having the structure $$HOCH_2(—C≡C)_nCH_2OH$$

are effective cotton defoliants. Among the acetylenic glycols found to be useful in this patent are 2-butyne-1,4-diol and 2,4-hexadiyne-1,6-diol, i.e., 2-butyne-1,4-diol gives 87% defoliation and 1,4-hexadiyne-1,6-diol gives 100% defoliation. However, this patent teaches that acetylenic alcohols are relatively ineffective as cotton defoliants. Specifically, the patent teaches that propargyl alcohol gives only 13% cotton plant defoliation, and 2-methyl-3-butynol-2, 3-methyl-1-pentynol-3 and 2-butyn-1-ol give 0% cotton plant defoliation.

It is an important object of the present invention to provide an improved method for cotton defoliation.

Another object of the present invention is to provide a method for defoliating plants which will substantially prevent regrowth of the leaves on the plants after defoliation.

Other objects of the present invention will be obvious from the following description and examples.

We have unexpectedly discovered that acetylenic alcohols made in accordance with United States Patent No. 2,273,141, having the following structure:

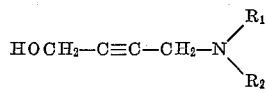

wherein $R_1$ is selected from the group consisting of lower alkyl and aryl having no more than two benzene nuclei, and $R_2$ is hydrogen when $R_1$ is aryl and lower alkyl when $R_1$ is lower alkyl, and wherein $R_1$ and $R_2$ taken together form with the nitrogen atom a heterocyclic substituent selected from a group consisting of morpholinyl and piperidyl, produce a surprisingly high percentage of defoliation.

The acetylenic glycols of Patent No. 2,801,160 as defoliates suffer from the disadvantage that they do not prevent regrowth of the leaves of the plants defoliated. In other words, after defoliating with the acetylenic glycols of the said Patent No. 2,801,160 new leaves appear on the plants and interfere with subsequent harvesting. Therefore, the subsequent regrowth of the leaves after treatment with the acetylenic glycols of Patent No. 2,801,160 makes the acetylenic glycols unsatisfactory as effective and efficient defoliates.

The acetylenic nitrogen-containing alcohols of the present invention not only act as excellent defoliates, but also prevent growth of the leaves on the plants after defoliating. This is an important desideratum of defoliates.

Foliage of cotton plants treated with the specific acetylenic alcohols of the instant invention shed their leaves and cause the bolls to open uniformly. Thus, the entire crop may be machine harvested at one time and also at an earlier date than normal because of the quick loss of leaves.

The amount of defoliant to be applied will depend upon the kind of vegetation to be defoliated and the density thereof, as well as the choice of defoliant compound. As is illustrated in the following examples, liquids containing as little as 0.1% by weight of the active ingredients have been used effectively. The defoliants of the present invention have been found to be effective when applied to normal cotton stands at rates varying from 1¼ to approximately 10 pounds per acre, but it is to be understood that these figures do not represent either maximum or minimum limits.

The defoliants of the present invention are applied to cotton usually when the bolls are from 35 to 40 days old, but this may vary with the season and climate.

The new defoliants of the present invention may be applied in a dust or a liquid form. The liquid form can be a water solution or an emulsion. The defoliants when in liquid form may be applied by conventional spray methods. When applied as a dust, the defoliants may be mixed with solid carriers such as finely divided clay, talc, pumice, bentonite and the like and then dusted onto the cotton plants.

While the defoliants of the present invention are of greatest value when the cotton crop is to be picked mechanically, they are also useful if the cotton is to be hand picked. The bolls open uniformly and with the leaves gone more cotton can be hand-harvested with one picking.

The following examples and tables will further illustrate the defoliation activity of the compounds of the present invention on cotton; however, the invention is not to be restricted by these examples.

EXAMPLE 1

Cotton plants several months old are chosen for treatment because at this time they have obtained maximum growth.

The test chemicals are applied to the plants by spraying with solutions containing a 0.1% and a 1.0% concentration of the active ingredient. The solutions are prepared by dissolving appropriate amounts of the defoliant in 5 milliliters of acetone, then adding 5 milliliters of a 1% solution of Tergitol NPX as a dispersant. Each solution was then made up to 100 milliliters with distilled water. After spraying, each plant was allowed to drain by laying the pots on their sides.

The results of defoliation were made 10 days and 30 days after treatment, that is, the number of leaves which drop after 10 and 30 days are compared to the number of leaves that remain on the untreated plant after 10 and 30 days.

Table 1

| Chemical | Concentration, percent | Mature Leaves 10 days | Remaining 30 days |
| --- | --- | --- | --- |
| 4-(N-morpholinyl)-2-butyn-1-ol | 0.1 | 7 | 6 |
|  | 1.0 | 0 | 0 |
| 4-(N-piperidyl)-2-butyn-1-ol | 0.1 | 3 | 0 |
|  | 1.0 | 0 | 0 |
| 4-(N,N-diethylamino)-2-butyn-1-ol | 0.1 | 6 | 4 |
|  | 1.0 | 0 | 0 |
| None (Control) | | 11 | 11 |

EXAMPLE 2

Twenty-five milliliters of each dilution used as foliar sprays in the preceding test were added to the soil of pots containing a single cotton plant. Observations were made of these plants following treatment at 10 and 30 days.

Table 2

| Chemical | Concentration, percent | Mature Leaves 10 days | Remaining 30 days |
| --- | --- | --- | --- |
| 4-(N-morpholinyl)-2-butyn-1-ol | 0.1 | 3 | 2 |
|  | 1.0 | 1 | 0 |
| 4-(N-piperidyl)-2-butyn-1-ol | 0.1 | 7 | 4 |
|  | 1.0 | 2 | 0 |
| 4-(N,N-diethylamino)-2-butyn-1-ol | 0.1 | 5 | 4 |
|  | 1.0 | 3 | 0 |
| None (Control) | | 11 | 11 |

As is shown by the results of the above tests, the defoliants of the present invention unexpectedly prevent regrowth of the leaves of the treated plants.

It is to be understood that the foregoing detailed description is given merely by way of illustration and that variations may be made therein without departing from the spirit of this invention.

What is claimed is:
1. A method of defoliating living plants having an annual leaf-drop, which comprises the step of applying to the leaves of the plant, in an amount sufficient to effect defoliation, an acetylenic alcohol corresponding to the formula

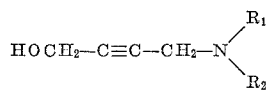

wherein $R_1$ is selected from the group consisting of lower alkyl and aryl having no more than two benzene nuclei, and $R_2$ is hydrogen when $R_1$ is aryl and lower alkyl when $R_1$ is lower alkyl and wherein $R_1$ and $R_2$ taken together form with the nitrogen atom a heterocyclic substituent selected from a group consisting of morpholinyl and piperidyl.

2. A method of defoliating cotton plants, which comprises the step of applying to the leaves of the plant, in an amount sufficient to effect defoliation, an acetylenic alcohol corresponding to the formula

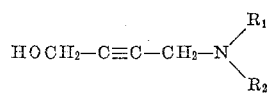

wherein $R_1$ is selected from the group consisting of lower alkyl and aryl having no more than two benzene nuclei, and $R_2$ is hydrogen when $R_1$ is aryl and lower alkyl when $R_1$ is lower alkyl and wherein $R_1$ and $R_2$ taken together form with the nitrogen atom a heterocyclic substituent selected from a group consisting of morpholinyl and piperidyl.

3. A method of defoliating living plants having an annual leaf drop which comprises the step of applying to the leaves of the plant, in an amount effective to defoliate the plant, 4-(N-morpholinyl)-2-butyn-1-ol.

4. A method of defoliating cotton plants which comprises the step of applying to the leaves of the plant, in an amount effective to defoliate the plant, 4-(N-morpholinyl)-2-butyn-1-ol.

5. A method of defoliating living plants having an annual leaf drop which comprises the step of applying to the leaves of the plant, in an amount effective to defoliate the plant, 4-(N-piperidyl)-2-butyn-1-ol.

6. A method of defoliating cotton plants which comprises the step of applying to the leaves of the plant, in an amount effective to defoliate the plant, 4-(N-piperidyl)-2-butyn-1-ol.

7. A method of defoliating living plants having an annual leaf drop which comprises the step of applying to the leaves of the plant, in an amount effective to defoliate the plant, 4-(N,N-diethylamino)-2-butyn-1-ol.

8. A method of defoliating cotton plants which comprises the step of applying to the leaves of the plant, in an amount effective to defoliate the plant, 4-(N,N-diethylamino)-2-butyn-1-ol.

9. The method according to claim 1 wherein $R_1$ and $R_2$ are lower alkyl.

10. The method according to claim 1 wherein $R_1$ is aryl and $R_2$ is hydrogen.

11. The method according to claim 2 wherein $R_1$ and $R_2$ are lower alkyl.

12. The method according to claim 2 wherein $R_1$ is aryl and $R_2$ is hydrogen.

References Cited in the file of this patent

UNITED STATES PATENTS 2,801,160     Iserson     July 30, 1957
2,936,227     Gysin et al.     May 10, 1960

OTHER REFERENCES

Plant Regulators, Chemical Biological Coordination Center, National Academy of Sciences, National Research Council, Publ. 384, No. 2, June 1955, pages a, b, c, l, and 23.